United States Patent [19]
Hoover

[11] 4,037,132
[45] July 19, 1977

[54] IMAGE TUBE POWER SUPPLY

[75] Inventor: Alan W. Hoover, Hollins, Va.

[73] Assignee: International Telephone and Telegraph Corporation, Nutley, N.J.

[21] Appl. No.: 646,799

[22] Filed: Jan. 6, 1976

[51] Int. Cl.² ............................................. H01J 31/26
[52] U.S. Cl. ............................... 315/10; 250/213 VT
[58] Field of Search ................ 315/10, 379, 381, 383; 250/213 R, 213 VT

[56] References Cited

U.S. PATENT DOCUMENTS

| | | | |
|---|---|---|---|
| 3,665,247 | 5/1972 | Gordon | 250/213 VT |
| 3,848,123 | 11/1974 | Parker et al. | 250/213 VT |
| 3,864,595 | 2/1975 | Lawrence et al. | 315/12 |

Primary Examiner—Maynard R. Wilbur
Assistant Examiner—T. M. Blum
Attorney, Agent, or Firm—John T. O'Halloran; Peter C. Van Der Sluys; Richard A. Menelly

[57] ABSTRACT

This power supply detects the total power input to an image tube of the type utilizing microchannel plate electron multipliers in order to set the image output brightness. A current sensing resistor in the oscillator circuit provides a feedback potential in proportion to the total power demand of the image tube. This potential is applied to a transistorized circuit for limiting the input to the oscillator to a predetermined level.

4 Claims, 6 Drawing Figures

IMAGE TUBE POWER SUPPLY

BACKGROUND OF THE INVENTION

Power supplies for image intensifiers utilizing the microchannel plate electron multipliers generally require expensive and complex electronic circuitry to accommodate for variations in input light levels while maintaining the output tube brightness relatively constant. A pair of oscillators, an automatic brightness control, and three high voltage multipliers are usually required along with a standard voltage clamp for good image tube operating performance. Since these circuits contain a plurality of expensive individual components it is very difficult to keep the tolerances of these individual components within the limits necessary to assure proper total circuit operation.

One method for achieving constant image tube brightness consists in detecting extremely small currents in the phosphor screen circuit. Since the variations in the phosphor screen current with changing levels of input light are very small complex circuit components are required to amplify these small current values to a useable level. The purpose of this invention therefore is to provide good image intensifier operation without the need for the complex electronic circuitry generally required for image tubes containing microchannel plate electron multipliers.

SUMMARY OF THE INVENTION

An image tube power supply utilizes a current detector element to detect changes in total tube power in relation to changes in tube input illumination. The current changes are then refelected in the low voltage power supply circuit where they are electronically sensed. A pair of transistors are coupled with the current detector to provide negative feedback for controlling the input voltage to the power supply oscillator. Controlling the input oscillator voltage in turn governs the operating voltages of the individual tube components resulting in good regulation of the tube output light intensity.

The power supply is further simplified by utilizing the bright source protection circuit components in combination with the microchannel plate strip resistance as a voltage divider. The output of a single voltage multiplier is divided by this circuit combinations between the voltage required for the cathode and the voltage required across the microchannel plate.

DESCRIPTION OF THE PRIOR ART

Figure 1:
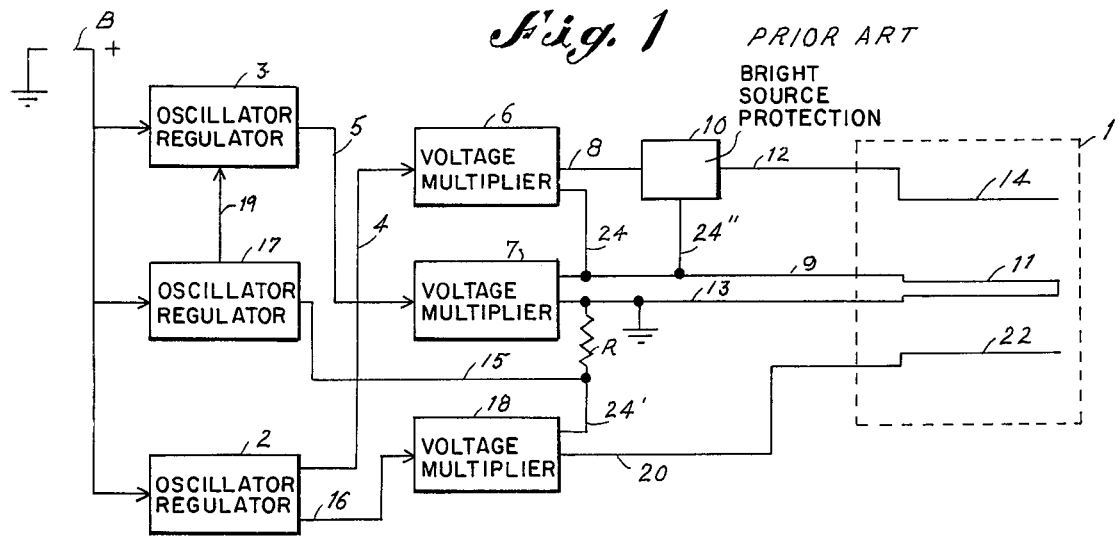
FIG. 1 is a block diagram of a prior art image tube power supply.

FIG. 1 is a block diagram of a typical power supply used for image tubes containing microchannel plate electron multipliers. The battery B applies voltage to a first oscillator regulator 3 and a second oscillator regulator 2 for converting the low input battery voltage to a high voltage A.C. at a regulated output level. The voltage level of the first oscillator 3 is applied to a first multiplier 7 by means of lead 5. The first multiplier 7 converts the input A.C. voltage to an increased D.C. voltage for connection to the image tube 1. The increased D.C. output of the first multiplier 7 is applied aross the microchannel plate electron multiplier 11 by means of leads 9 and 13. The output of the first multiplier 7 is also connected to the output of a second multiplier 6 by means of lead 24. Battery B also supplies input voltage to a second oscillator regulator 2 which provides a high voltage A.C. to a second multiplier 6 by means of lead 4. The high voltage D.C. output of the second multiplier 6 is referenced to the output voltage of the first multiplier 7 and is coupled with a bright source protector circuit 10 by means of lead 8. The bright source protector circuit (BSP) 10 is a clamp circuit which maintains the tube cathode potential at about 1 - 2 volts as the tube cathode current increases above some preset level. This is to protect the cathode 14 at high input light levels. The cathode 14 is connected to the BSP circuit 10 by means of lead 12. The high voltage output of the second oscillator regulator 2 is also applied to the input of a third multiplier 18 by means of lead 16. The high positive D.C. output of the third multiplier 18 is connected to the tube phosphor screen 22 by means of lead 20. The light output occurring at the phosphor screen 22 is regulated in the following manner. A sensing resistor R is connected to lead 24' in the ground return of the third multiplier 18 in order to detect changes in screen current. The voltage drop across R which increases with increasing screen current is applied to the automatic brightness control circuit 17 by means of lead 15. The automatic brightness control circuit (ABC) 17 generally contains a field effect transistor in combination with four resistors, a capacitor and a diode, and operates to control the first oscillator regulator 3 by decreasing the output of the first multiplier 7 resulting in reduced voltage to the microchannel plate 11 to keep the screen current constant at the aforementioned pre-set level. Since the accelerating potential between the microchannel plate and the screen and the current into the screen are both maintained at a constant level, then constant power is supplied to the screen resulting in a constant phoshor light output when the input level is high enough to activate the ABC circuit. The tube output brightness therefore will remain constant over a wide range of input illumination to the tube above a predetermined input illumination value. One example of prior art power supply currently used with image intensifier tubes can be seen by reference to U.S. Pat. No. 3,666,947 issued to W. R. Wyess.

DESCRIPTION OF THE PREFERRED EMBODIMENT

Figure 2:
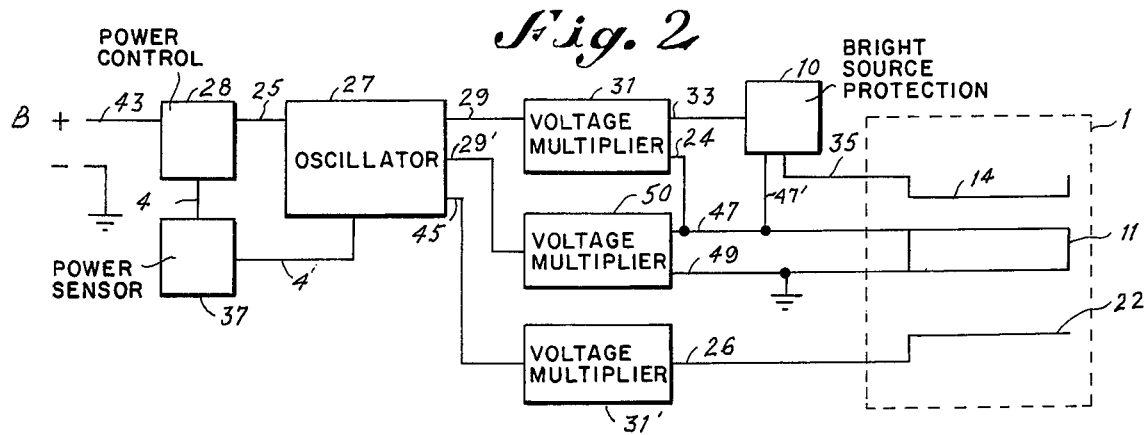
FIG. 2 is a block diagram of the image tube power supply of this invention.

One embodiment of this invention can be seen by reference to FIG. 2. Battery B is connected to a single oscillator 27 by means of leads 25, 43 and power control circuit 28 and supplies the oscillator input with a low constant D.C. voltage. The oscillator output leads 29' and 45 supply an increased A.C. voltage to multipliers 31, 31' and 50 where the voltage is rectified and increased to a much higher value. The output of multiplier 31 is connected to the cathode 14 of image tube 1 by means of leads 33, 35, 47' and BSP circuit 10. The BSP circuit 10 operates in a similar manner known BSP circuits to protect the cathode against sudden current surges caused by large variations in input illumination to the tube 1. Coupled between the battery B and oscillator 27 by means of leads 43, 41, 41' and 25 is a power sensor circuit 37 and power control circuit 28, the function of which will be described in greater detail below. The output of oscillator 27 is connected to the input of multiplier 50 by means of lead 45, and the output of multiplier 50 is coupled to the microchannel plate 11 by means of leads 47, 49. The phosphor screen 22 is coupled to the output of a third multiplier 31 by lead 26. The input of the third multiplier 31' is connected to the output of oscillator 27 by lead 45.

Figure 4:
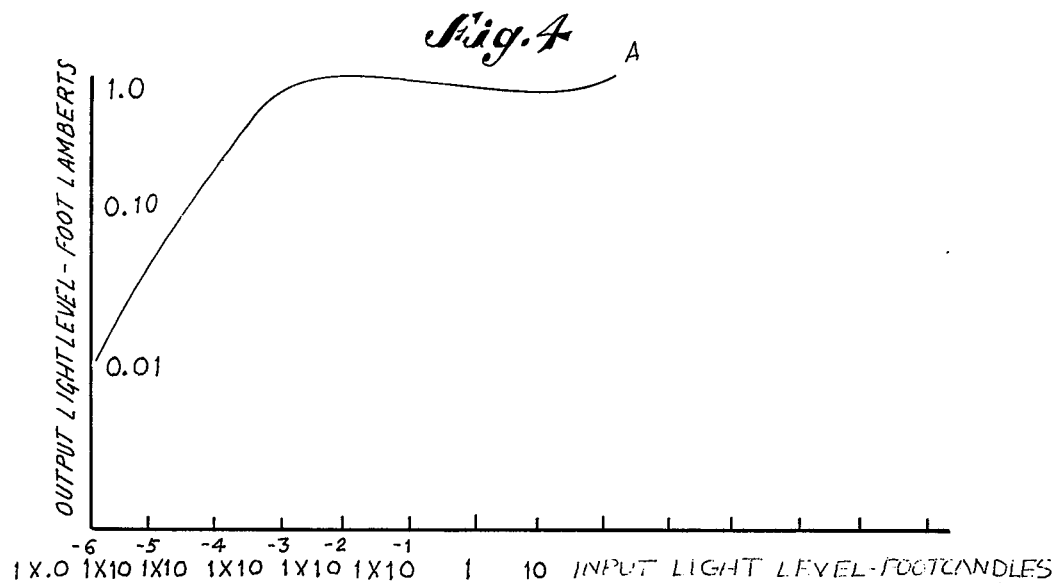
FIG. 4 is a graphic representation of the light response characteristics of an image intensifier tube employing the circuit of FIG. 3.

In operation, the D.C. voltage derived from battery B is converted from low voltage D.C. to high voltage A.C. by means of oscillator 27. The oscillator 27 in turn drives the high voltage multipliers 31, 31' and 50 which increase the voltage output level and converts the high A.C. voltage back to D.C. at high potential. The high potential D.C. voltage is applied to the intensifier tube components to provide proper operation. When the cathode 14 is shielded from any light illumination a fixed level of input current from battery B is demanded by the power supply circuit. This current, designated as quiescent current, is determined chiefly by circuit losses and by the mirochannel plate (dark) current demand. As light is caused to fall upon the cathode 14 and the light input level is increased, light-induced currents begin to flow in the tube 1. The increased current flow requires an increased power level which is reflected back through the circuit to the D.C. input of battery B. This increased power demand can therefore be detected at any convenient point in the system and used to control the voltage aplied to the tube 1. If the voltage on the tube elements, namely the cathode 14, microchannel plate 11 and phosphor screen 22, is caused to decrease as the light-induced tube current increases the tube output level light level will remain relatively constant. The variation of tube output brightness A as a function of input illumination is shown in FIG. 4.

Figure 3:
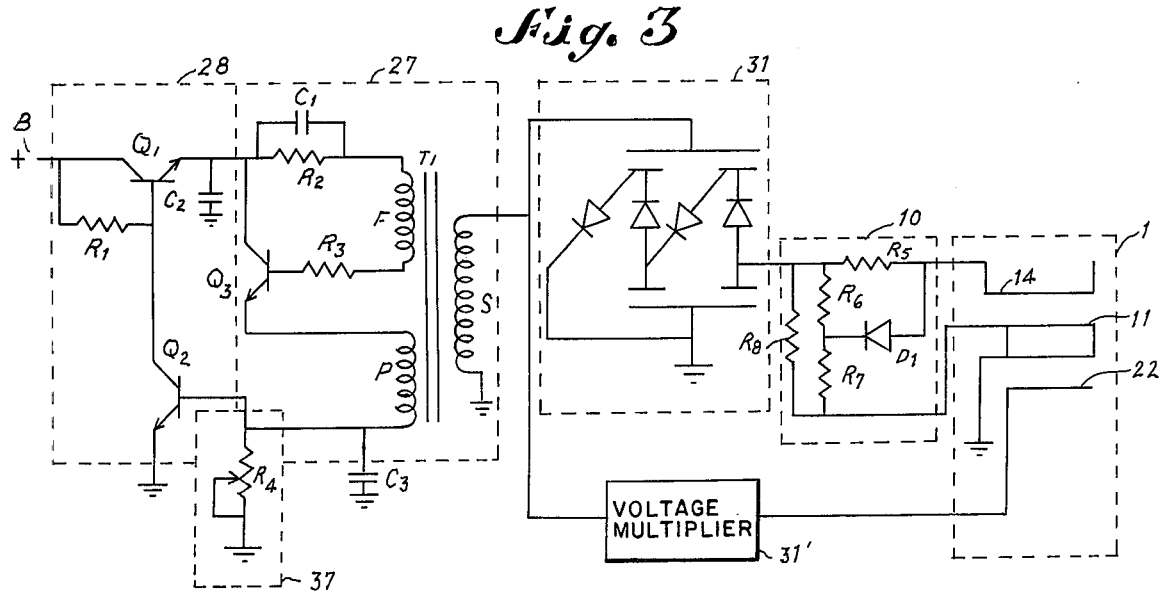
FIG. 3 is a circuit diagram of the power supply of FIG. 2.

FIG. 3 is a detailed circuit diagram containing some of the components of the block diagram of FIG. 2 and describes the operation of the power sensor circuit 37 and the power control circuit 28 in greater detail. D.C. power is applied to the collector of series pass transistor $Q_1$ by connection ot the positive terminal of battery B. Current flows through $Q_1$ by connection between the emitter of $Q_1$ and the input to oscillator 27. Oscillator 27 consists of resistors $R_2$, $R_3$, capacitor $C_1$, transistor $Q_3$ and transformer $T_1$ connected together to form a class C oscillator. The power control circuit 28 consists of transistors $Q_1$, $Q_2$ and resistor $R_1$. Resistor $R_2$ and capacitor $C_1$ bias transistor $Q_3$ in the active region, and resistor $R_3$ limits minimum base current in transistor $Q_3$ and stabilizes the oscillator characteristic for variation in characteristics of transistor $Q_3$. Capacitor $C_2$ connected to the emitter of transistor $Q_1$collector transistor $Q_3$, and to one side of capacitor $C_1$ and resistor $R_2$, provides a low A.C. source impedance to oscillator 27. Load changes at the secondary S of transformer $T_1$ are reflected back into the primary P and can be sensed by detecting the voltage drop occurring across resistor $R_4$which is coupled between transformer primary P and ground. Capacitor $C_3$ coupled between primary P and ground serves to bypass A.C. components occurring across $R_4$ and should thereform have a reactance that is low compared to the resistance value $R_4$ at operating frequency of oscillator 27. The emitter of $Q_3$ is connected to one side of transformer primary P. One side of $R_4$ is connected to the base of transistor $Q_2$so that the voltage appearing across $R_4$ is used to control the conduction through transistor $Q_2$which in turn control the conduction through $Q_1$. The collector of $Q_2$ is connected to the base of $Q_1$ and the emitter of $Q_2$ is connected to ground. This connection comprises a feedback circuit constructed in such a way as to provide negative feedback such that increasing current through $R_4$ causes the voltage occurring across $R_4$to increase and the voltage applied to oscillator 27 to decrease. This in turn results in the current through $R_4$being maintained at a constant value. Thus the effective power sensor 37 could consist of a resistive element connected between the oscillator transformer primary and ground. The combination of the current flow through resistor $R_4$ and the resulting voltage drop provide an approximate means for determining effective input power requirements of the image intensifier.

High voltage multipliers 31 and 31' are connected to the output of $T_1$. Multiplier 31' is a 12-stage multiplier which multiplies and rectifies the 500 volt output of $T_1$ to generate +6,000 volts D.C. which is applied directly to the phosphor screen 22. Multiplier 31, consisting of a plurality of capacitors and diodes in voltage doubling arrangement, increases and rectifies the 500 volts provided by transformer $T_1$ to a −1,000 volts D.C. level for connection to the microchannel plate 11 and cathode 14. The bright source protection circuit 10 comprises resistors $R_5$, $R_6$, $R_7$, $R_8$, connected with diode $D_1$ to form a voltage clamp for maintaining the voltage applied to cathode 14 at a predetermined minimum level. Resistors $R_6$ and $R_7$ parallel with $R_8$ also serve to form a voltage divider in combination with the resistance of the microchannel plate 11. This provides −800 volts across microchannel plate 11 and −200 volts on cathode 14. In order to set the overall intensifier gain level it is necessary to adjust the voltage level across the microchannel plate 11. This is easily accomplished by varying the value of resistor $R_8$ rather than adjusting the values of both resistors $R_6$ and $R_7$. The utilization of the circuit components of the bright source protection circuit 10 in combination with the resistance of microchannel plate 11 multifunctionally provides the correct voltage for both the tube cathode 14 and microchannel plate 11 without the necessity of a third multiplier as is required with power supplies of the prior art as described earlier. Since both of these tube elements are supplied by the same multiplier 31 and oscillator 27 then the method of sensing effective input power by means of resistor $R_4$and the feedback relationship between transistors $Q_1$ and $Q_2$ to control the input power oscillator 27 is a very simple method for controlling the light output of tube 1. The voltage multiplier provided by the combination of the resistive elements in the BSP circuit 10 and the resistance of the microchannel plate 11 is possible since the so-called "strip" resistance of the microchannel plate 11 is measured constant value. The strip resistance for resistance to current flow provided by the integral electrical properties of the microchannel plate material is typically in the order of between $10^6$ and $10^{10}$ ohms. The strip resistance depends to large extent upon the degree of activation of the microchannel plate glass when the glass is of the lead oxide type and is made conductive by treating the glass in a reducing atmosphere. Resistance values in the order of $10^8$ and $10^9$ ohms are usually employed, and these values remain relatively constant throughtout the life of the image tube. Typical values employed for image tube circuits used with image tubes containing microchannel plate are 200 volts between the image tube cathode and the input face of the microchannel plate, and 800volts between the input and output faces of the microchannel plate. Since the output voltage of the voltage multiplier 31 is typically in the order of 1,000 volts, the resistance values of resistors $R_5$, $R_6$, $R_7$ and $R_8$ of the BSP circuit 10 are chosen so that the voltage appearing between the cathode 14 and the microchannel plate 11 is approximately 200 volts and the voltage appearing across the microchannel plate 11 is approximately 800 volts when no input illumination is caused to fall upon the tube cathode 14.

Prior art power supplies using several oscillators and multipliers to individually provide operating power to the tube components generally sense the operating current of one of the tube components, such as the phosphor screen current, and control the tube operating characteristics for this component by varying the microchannel plate voltage. The power requirements of the other tube operating components is not affected. Earlier attempts to control image tube light output by simplified circuit means for monitoring one of the tube operating parameters and providing feedback control to the tube operating voltages have not been successful since the tube parameters such as photocathode current and phosphor screen current represent values in the order of nanoamps. Changes in the order of several nanoamps require complex and expensive circuitry to detect, amplify and use signals of such small value. It was unexpected therefore that changes in the total tube operating power could be useably detected in the input power requirements to the power supply. It was heretofore believed that changes in the increasing light level to the tube cathode would have little effect on the tube operating power requirements, nor was it realized that there would be enough change in effective tube power demand with increasing light level to achieve effective control over the tube output light level. Employing constant current control on the primary side of the power supply, however, unexpectedly provides high light level tube saturation characteristics which are relatively constant over a five decade range of tube input light illumination.

Figure 5:
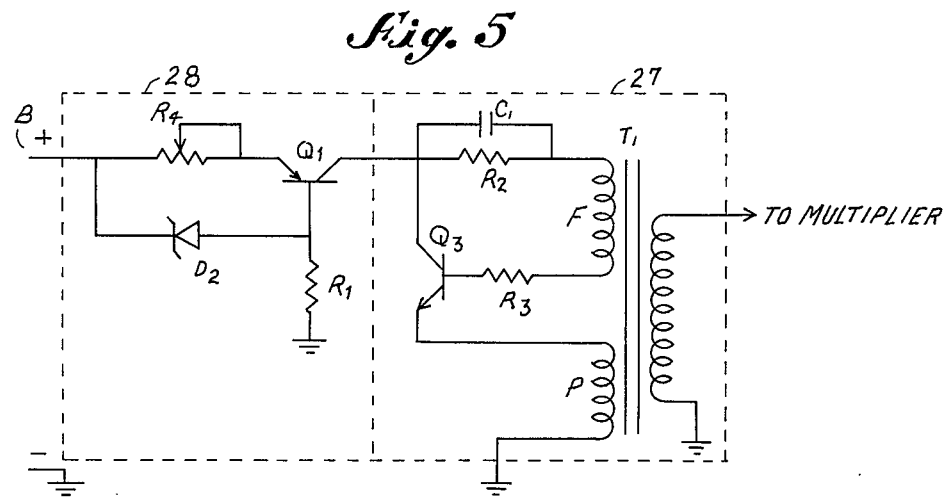
FIG. 5 is an alternate embodiment of the circuit of FIG. 3.

FIG. 5 shows an alternate arrangement for the controlled power supply of this invention. In this embodiment of FIG. 5 the effective power sensing resistor $R_4$ is connected between the battery B and the emitter of transistor $Q_1$ and a zener diode $D_2$ is connected between the base of $Q_1$ and the battery B. Resistor $R_1$ is connected to the base of $Q_1$, the anode $D_2$ and ground. In this arrangement the diode $D_2$ functions as a reference element, $Q_1$ functions as a combined comparison and power control element, and resistor $R_4$ senses the total current change. This circuit provides a constant current source independent of input light over a predetermined value of input illumination.

Figure 6:
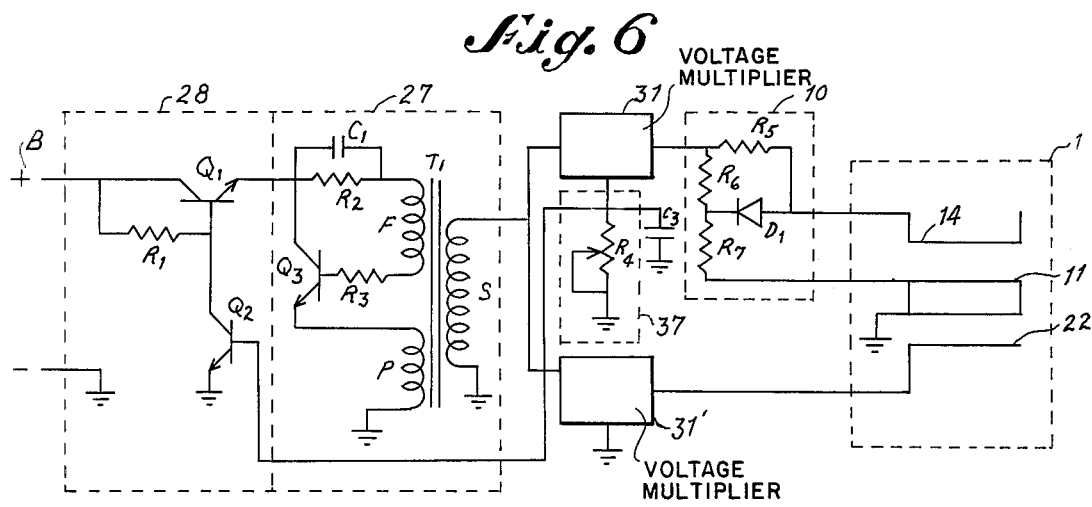
FIG. 6 is a further embodiment of the circuit of FIG. 3.

FIG. 6 is an alternate embodiment of the circuit of FIG. 3 where the effective power sensor resistor $R_4$ is coupled between the output of multiplier 31 and ground, and capacitor $C_3$ is coupled in parallel with resistor $R_4$. In this arrangement $R_4$ senses the changes in current in both the cathode 14 and the microchannel plate 11 and reflects these changes in the input circuit to oscillator 27 by connection to the base of transistor $Q_2$ in the manner as described earlier for the power control circuit 37 of the embodiment of FIG. 3.

Although the feedback mechanism is described as employing transistors in various arrangements within the power control circuit, it is readily apparent that other circuit elements can be used to provide the feedback and control function. Power sensing elements in the embodiments discussed are resistive type elements which reflect a voltage difference in relation to the quantity of current transmitted through the element. Other known elements which reflect positive volt-ampere characteristics, where the voltage increases in relation to current, can also be employed.

The use of the controlled power supply of this invention primarily finds application with image tubes that are used for mobile type application such as night vision devices for military purposes and for providing vision to people suffering from night blind diseases. This is in no way intended as a limitation in scope. The controlled power supply of this invention finds application wherever compact and inexpensive circuitry is required for monitoring light power requirements and for controlling operational power to all type opticalelectronic devices.

What is claimed is:

1. A controlled device brightness power supply for image tubes of the type containing a micro-channel plate electron multiplier and a phosphor screen comprising:

oscillator means for providing A.C. power when coupled with a source of D.C. power;

rectifier means coupled with said oscillator for providing D.C. power to the tube;

power sensing means consisting of a resistive element electrically coupled in series between said D.C. power source and said oscillator for detecting changes in tube operating power corresponding to changes in the tube input illumination and reducing the microchannel plate electron multiplier voltage to provide a constant illumination at the phosphor screen; and control circuit means electrically coupled with the power sensor and oscillator in feed-back relation for controlling the A.C. power in repsonse to the changes in the tube operating power consisting of at least one transistor electrically coupled between the oscillator and the D.C. power source to control the conduction through the oscillator.

2. The power supply of claim 1 further including:

bright source protection circuit means electrically coupled with the micro-channel plate and the rectifier for preventing increases in tube illumination from damaging the tube cathode said bright source protection circuit consisting of a voltage clamp having resistive means and diode means and wherein the micro-channel plate provides further resistive means to form a voltage divider with said voltage clamp.

3. The power supply of claim 1 including:

bright source protection circuit means electrically coupled with the micro-channel plate and the rectifier for preventing increases in tube illumination from damaging the tube cathode said bright source protection circuit consisting of a voltage clamp having resistive means and diode means wherein the resistive means comprises a pair of first resistors in series with each other and in common with the cathode of said diode means for setting the operational voltage level of said diode means and a second resistor electrically coupled between one of said first resistors and both the anode of said diode and said tube cathode for sensing the current into said cathode.

4. A controlled brightness power supply for image tubes of the type having a micro-channel plate electron multiplier comprising;

oscillator means for providing A.C. power when coupled with a source of D.C. power;

rectifier means coupled with said oscillator for providing D.C. power to the tube;

bright source protection circuit means electrically coupled with the micro-channel plate and rectifier for preventing increases in tube illumination from damaging the tube cathode; and At least one resistor serially coupled with at least one output of said microchannel plate for detecting changes in the tube input illumination and limiting the D.C. power to the oscillator when current through the resistor exceeds a predetermined value.

* * * * *